US008633936B2

(12) United States Patent
Du et al.

(10) Patent No.: US 8,633,936 B2
(45) Date of Patent: *Jan. 21, 2014

(54) PROGRAMMABLE STREAMING PROCESSOR WITH MIXED PRECISION INSTRUCTION EXECUTION

(75) Inventors: Yun Du, San Diego, CA (US); Chun Yu, San Diego, CA (US); Guofang Jiao, San Diego, CA (US); Stephen Molloy, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1014 days.

This patent is subject to a terminal disclaimer.

(21) Appl. No.: 12/106,654

(22) Filed: Apr. 21, 2008

(65) Prior Publication Data

US 2009/0265528 A1    Oct. 22, 2009

(51) Int. Cl.
*G06T 1/00* (2006.01)
*G06F 15/00* (2006.01)
*G06F 15/16* (2006.01)

(52) U.S. Cl.
USPC ............................. 345/522; 345/501; 345/502

(58) Field of Classification Search
USPC ......... 345/426, 501, 502, 522, 530, 536, 559, 345/561
See application file for complete search history.

(56) References Cited

U.S. PATENT DOCUMENTS

| 5,734,874 | A | * | 3/1998 | Van Hook et al. | 345/559 |
| 5,784,588 | A | * | 7/1998 | Leung | 712/216 |
| 5,953,237 | A | * | 9/1999 | Indermaur et al. | 700/295 |
| 6,044,216 | A | * | 3/2000 | Bhargava et al. | 717/114 |
| 7,079,156 | B1 | * | 7/2006 | Hutchins et al. | 345/606 |
| 7,418,606 | B2 | * | 8/2008 | Holmer | 713/320 |
| 7,685,579 | B2 | * | 3/2010 | Knowles | 717/140 |
| 7,716,655 | B2 | * | 5/2010 | Uchida | 717/140 |

(Continued)

FOREIGN PATENT DOCUMENTS

| CN | 101131768 A | 2/2008 |
| JP | 04135277 | 5/1992 |

(Continued)

OTHER PUBLICATIONS

"Modifiers for ps_2_0 and Above" <http://msdn.microsoft.com/archive/default.asp?url=/archive/en-us/directx9_c_summer_03/directx/graphics/reference/assemblylanguageshaders/pixelshaders/instructions/modifiers_ps_2_0.asp> Microsoft DirectX 9.0 SDK Update (Summer 2003).

(Continued)

*Primary Examiner* — Joni Richer
(74) *Attorney, Agent, or Firm* — James R. Gambale, Jr.

(57) ABSTRACT

The disclosure relates to a programmable streaming processor that is capable of executing mixed-precision (e.g., full-precision, half-precision) instructions using different execution units. The various execution units are each capable of using graphics data to execute instructions at a particular precision level. An exemplary programmable shader processor includes a controller and multiple execution units. The controller is configured to receive an instruction for execution and to receive an indication of a data precision for execution of the instruction. The controller is also configured to receive a separate conversion instruction that, when executed, converts graphics data associated with the instruction to the indicated data precision. When operable, the controller selects one of the execution units based on the indicated data precision. The controller then causes the selected execution unit to execute the instruction with the indicated data precision using the graphics data associated with the instruction.

68 Claims, 6 Drawing Sheets

(56) References Cited

U.S. PATENT DOCUMENTS

| | | |
|---|---|---|
| 2005/0066205 A1 | 3/2005 | Holmer |
| 2007/0186082 A1 | 8/2007 | Prokopenko et al. |
| 2007/0273698 A1 | 11/2007 | Du et al. |
| 2007/0283356 A1 | 12/2007 | Du et al. |
| 2007/0292047 A1 | 12/2007 | Jiao et al. |
| 2007/0296729 A1 | 12/2007 | Du et al. |
| 2008/0235316 A1 | 9/2008 | Du et al. |

FOREIGN PATENT DOCUMENTS

| | | |
|---|---|---|
| JP | 5303498 A | 11/1993 |
| JP | 6297031 A | 10/1994 |
| JP | 2005293386 A | 10/2005 |
| JP | 2007079844 A | 3/2007 |
| JP | 2007514209 A | 5/2007 |
| JP | 2009140491 A | 6/2009 |
| TW | 200519730 | 6/2005 |

OTHER PUBLICATIONS

International Search Report & Written Opinion—PCT/US2009/041268, International Search Authority—European Patent Office—Sep. 29, 2009.

U. J. Kapasi et al.: "Programmable Stream Processors" Computer, Aug. 2003, pp. 54-62, XP002543695 Published by IEEE Computer Society the whole document.

* cited by examiner

PROGRAMMABLE STREAMING PROCESSOR WITH MIXED PRECISION INSTRUCTION EXECUTION

TECHNICAL FIELD

The disclosure relates to graphics processing and, more particularly, to graphics processor architectures.

BACKGROUND

Graphics devices are widely used to render 2-dimensional (2-D) and 3-dimensional (3-D) images for various applications, such as video games, graphics programs, computer-aided design (CAD) applications, simulation and visualization tools, imaging, and the like. A graphics device may perform various graphics operations to render an image. The graphics operations may include rasterization, stencil and depth tests, texture mapping, shading, and the like. A 3-D image may be modeled with surfaces, and each surface may be approximated with polygons, such as triangles. The number of triangles used to represent a 3-D image for rendering purposes is dependent on the complexity of the surfaces as well as the desired resolution of the image.

Each triangle may be defined by three vertices, and each vertex is associated with various attributes such as space coordinates, color values, and texture coordinates. When a graphics device uses a vertex processor during the rendering process, the vertex processor may process vertices of the various triangles. Each triangle is also composed of picture elements (pixels). When the graphics device also, or separately, uses a pixel processor during the rendering process, the pixel processor renders each triangle by determining the values of the components of each pixel within the triangle.

In many cases, a graphics device may utilize a shader processor to perform certain graphics operations such as shading. Shading is a highly complex graphics operation involving lighting and shadowing. The shader processor may need to execute a variety of different instructions when performing rendering, and typically includes one or more execution units to aid in the execution of these instructions. For example, the shader processor may include arithmetic logic units (ALU's) and/or an elementary functional unit (EFU) as execution units. Often, these execution units are capable of executing instructions using full data-precision circuitry. However, such circuitry can often require more power, and the execution units may take up more physical space within the shader processor integrated circuit used by the graphics device.

SUMMARY

In general, the disclosure relates to a programmable streaming processor of a graphics device that is capable of executing mixed-precision (e.g., full-precision, half-precision) instructions using different execution units. For example, the programmable processor may include one or more full-precision execution units along with one or more half-precision execution units. Upon receipt of a binary instruction and an indication of a data precision for execution of the instruction, the processor is capable of selecting an appropriate execution unit for executing the received instruction with the indicated data precision. The processor may comprise an instruction-based, adaptive streaming processor for mobile graphics applications.

By doing so, the processor may avoid using one execution unit to execute instructions with various different data precisions. As a result, unnecessary precision promotion may be reduced or eliminated. In addition, application programmers may have increased flexibility when writing application code. An application programmer may specify different data precision levels for different application instructions, which are then compiled into one or more binary instructions that are processed by the processor.

In one aspect, the disclosure is directed to a method that includes receiving a graphics instruction for execution within a programmable streaming processor, receiving an indication of a data precision for execution of the graphics instruction, and receiving a conversion instruction that, when executed by the processor, converts graphics data associated with the graphics instruction to the indicated data precision, wherein the conversion instruction is different than the graphics instruction. The method further includes selecting one of a plurality of execution units within the processor based on the indicated data precision, and using the selected execution unit to execute the graphics instruction with the indicated data precision using the graphics data associated with the graphics instruction.

In one aspect, the disclosure is directed to a computer-readable medium including instructions for causing a programmable streaming processor to receive a graphics instruction for execution within the processor, to receive an indication of a data precision for execution of the graphics instruction, and to receive a conversion instruction that, when executed by the processor, converts graphics data associated with the graphics instruction to the indicated data precision, wherein the conversion instruction is different than the graphics instruction. The computer-readable medium further includes instructions for causing the processor to select one of a plurality of execution units within the processor based on the indicated data precision, and to use the selected execution unit to execute the graphics instruction with the indicated data precision using the graphics data associated with the graphics instruction.

In one aspect, the disclosure is directed to a programmable streaming processor that includes a controller and multiple execution units. The controller is configured to receive a graphics instruction for execution and to receive an indication of a data precision for execution of the graphics instruction. The controller is also configured to receive a conversion instruction that, when executed by the processor, converts graphics data associated with the graphics instruction to the indicated data precision, wherein the conversion instruction is different than the graphics instruction. When operable, the controller selects one of the execution units based on the indicated data precision. The controller then causes the selected execution unit to execute the graphics instruction with the indicated data precision using the graphics data associated with the graphics instruction.

In another aspect, the disclosure is directed to a computer-readable medium that includes instructions for causing a processor to analyze a plurality of application instructions for a graphics application, and, for each application instruction that specifies a first data precision level for its execution, to generate one or more corresponding compiled instructions that each indicate the first data precision level for its execution. The computer-readable medium includes further instructions for causing the processor to generate one or more conversion instructions to convert graphics data from a second, different data precision level to the first data precision level when the one or more compiled instructions are executed.

In one aspect, the disclosure is directed to a computer-readable data storage medium having one or more first executable instructions that, when executed by a programmable streaming processor, support one or more functions of a graphics application, wherein each of the first executable instructions indicates a first data precision level for its execution. The computer-readable data storage medium further includes one or more second executable instructions that, when executed by the processor, support one or more functions of the graphics application, wherein each of the second executable instructions indicates a second data precision level different from the first data precision level for its execution. The computer-readable data storage medium further includes one or more third executable instructions that, when executed by the processor, support one or more functions of the graphics application, wherein each of the third executable instructions converts graphics data from the second data precision level to the first data precision level when the one or more first executable instructions are executed.

The details of one or more aspects of the disclosure are set forth in the accompanying drawings and the description below. Other features, objects, and advantages will be apparent from the description and drawings, and from the claims.

DETAILED DESCRIPTION

Figure 1:
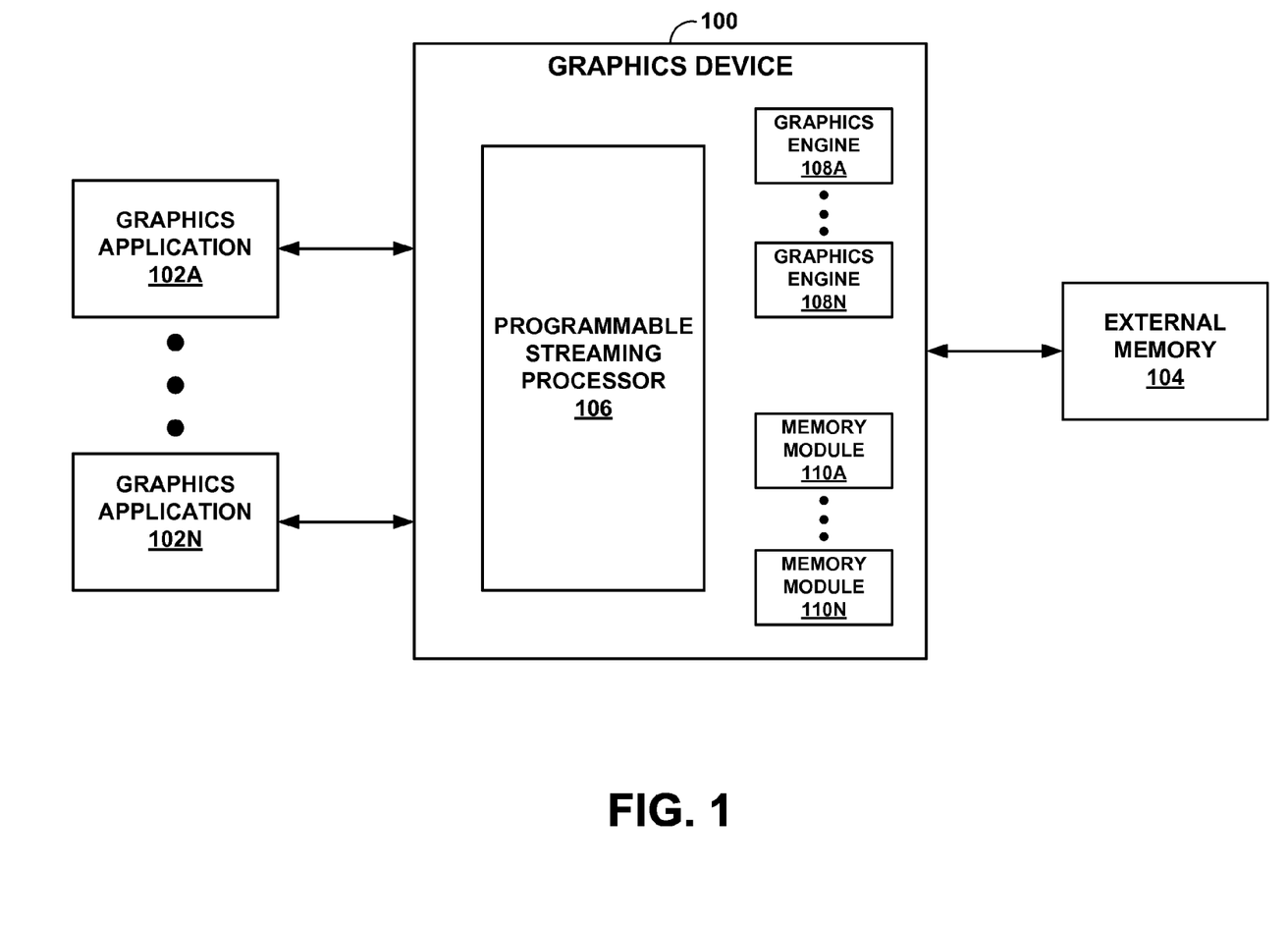
FIG. 1 is a block diagram illustrating various components that may be included within a graphics processing system, according to an aspect of the disclosure.

FIG. 1 is a block diagram illustrating various components that may be included within a graphics processing system, according to one aspect of the disclosure. This graphics processing system may be a stand-alone system or may be part of a larger system, such as a computing system or a wireless communication device (such as a wireless communication device handset), or part of a digital camera or other video device. The exemplary system shown in FIG. 1 may include one or more graphics applications 102A-102N, a graphics device 100, and external memory 104. Graphics device 100 may be communicatively coupled to external memory 104 and each of graphics applications 102A-102N. In one aspect, graphics device 100 may be included on one or more integrated circuits, or chips.

The graphics applications 102A-102N may include various different applications, such as video game, video, camera, or other graphics or streaming applications. These graphics applications 102A-102N may run concurrently and are each able to generate threads of execution to achieve desired results. A thread indicates a specific task that may be performed with a sequence of one or more graphics instructions. Threads allow graphics applications 102A-102N to have multiple tasks performed simultaneously and to share resources.

Graphics device 100 receives the threads from graphics applications 102A-102N and performs the tasks indicated by these threads. In the aspect shown in FIG. 1, graphics device 100 includes a programmable streaming processor 106, one or more graphics engines 108A-108N, and one or more memory modules 110A-110N. Processor 106 may perform various graphics operations, such as shading, and may compute transcendental elementary functions for certain applications. In one aspect, processor 106 may comprise an instruction-based, adaptive streaming processor for mobile graphics applications. Graphics engines 108A-108N may perform other graphics operations, such as texture mapping. Memory modules 110A-110N may include one or more caches to store data and graphics instructions for processor 106 and graphics engines 108A-108N.

Graphics engines 108A-108N may include one or more engines that perform various graphics operations, such as triangle setup, rasterization, stencil and depth tests, attribute setup, and/or pixel interpolation. External memory 104 may be a large, slower memory with respect to memory modules 110A-110N. In one aspect, external memory 104 is located further away (e.g., off-chip) from graphics device 100. External memory 104 stores data and graphics instructions that may be loaded into one or more of the memory modules 110A-110N.

In one aspect, processor 106 is capable of executing mixed-precision (e.g., full-precision, half-precision) graphics instructions using different execution units, given that different graphics applications 102A-102N may have different requirements regarding ALU precision, performance, and input/output formats. As an example, processor 106 may include one or more full-precision execution units along with one or more partial-precision execution units. The partial-precision execution units may be, for example, half-precision execution units. Processor 106 may use its execution units to execute graphics instructions for one or more of graphics applications 102A-102N. Upon receipt of a binary instruction (such as from external memory 104 or one of memory modules 110A-110N), and also an indication of a data precision for execution of the graphics instruction, processor 106 may select an appropriate execution unit for executing the received instruction with the indicated data precision using graphics data. Processor 106 may also receive a separate conversion instruction that, when executed, converts graphics data associated with the graphics instruction to the indicated data precision. In one aspect, the conversion instruction is a separate instruction that is different from the graphics instruction.

The graphics data may be provided by graphics applications 102A-102N, or may be retrieved from external memory 104 or one of memory modules 110A-110N, or may be provided by one or more of graphics engines 108A-108N. By selectively executing instructions in different execution units based upon indicated data precisions, processor 106 may avoid using a single execution unit to execute both full-precision and half-precision instructions. In addition, programmers of graphics applications 102A-102N may have increased flexibility when writing application code. For example, an application programmer may specify data precision levels for application instructions, which are then compiled into one or more binary instructions that are processed by processor 106. Processor 106 selects appropriate execution units to execute the binary instructions based on the data precision associated with the execution units and the binary instructions. In addition, processor 106 may execute the received conversion instruction to convert the graphics data associated with the instruction to the indicated data precision, if necessary. For example, if the provided graphics data has a data precision that is different from the indicated data precision, processor 106 may execute the conversion instruction to convert the graphics data to the indicated data precision, such that the graphics instruction may be executed by the selected execution unit.

Figure 2A:
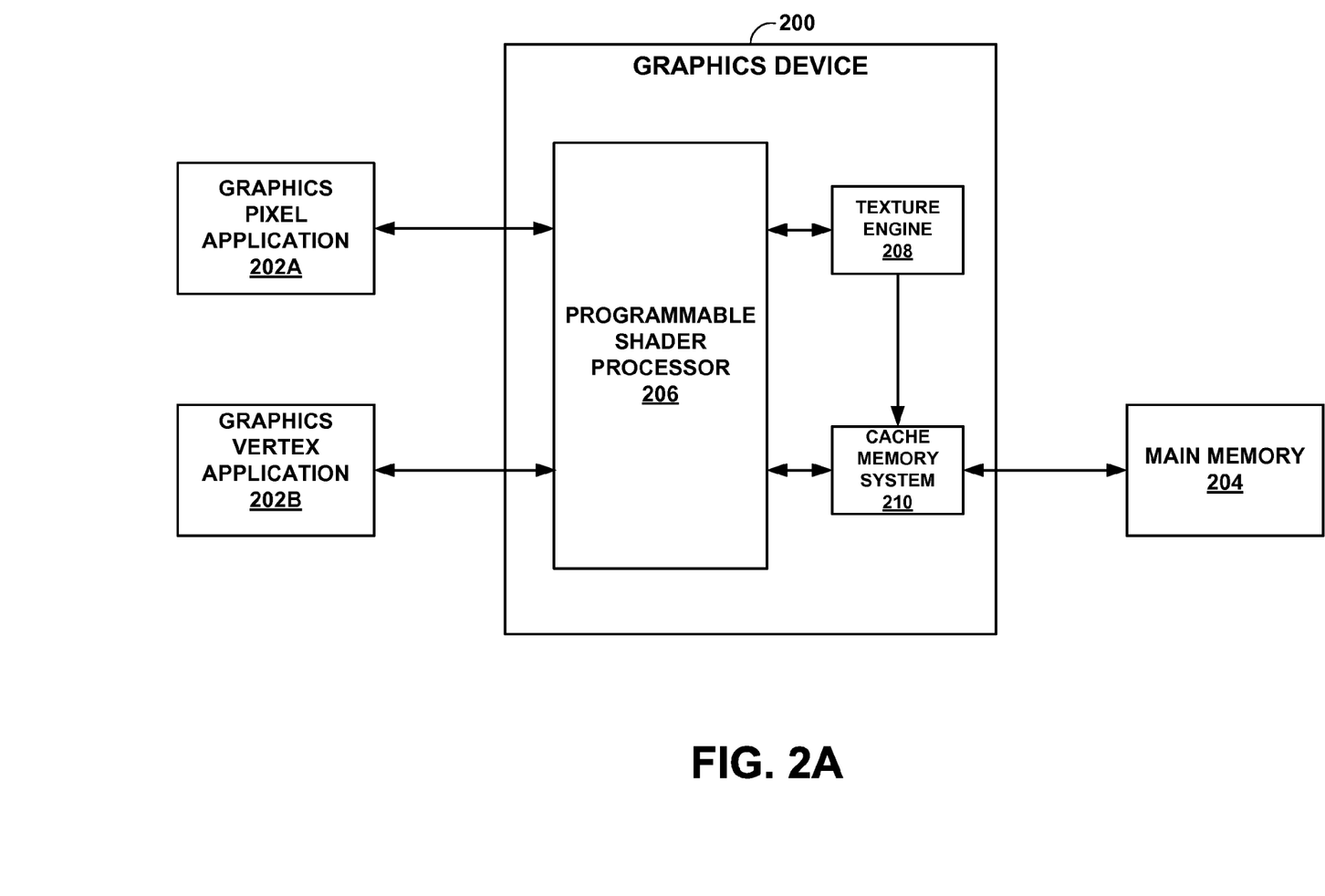
FIG. 2A is a block diagram illustrating an exemplary graphics processing system that includes a programmable shader processor, according to an aspect of the disclosure.

FIG. 2A is a block diagram illustrating an exemplary graphics processing system that includes a programmable shader processor 206, according to one aspect. In this aspect, the graphics processing system shown in FIG. 2A is an exemplary instantiation of the more generic system shown in FIG. 1. In one aspect, shader processor 206 is a streaming processor. In FIG. 2A, the exemplary system includes two graphics applications 202A and 202B that are each communicatively coupled to a graphics device 200. In the example of FIG. 2A, graphics application 202A is a pixel application that is capable of processing and managing graphics imaging pixel data. In the example of FIG. 2A, graphics application 202B is a vertex application that is capable of processing and managing graphics imaging vertex data. In one aspect, graphics pixel application 202A comprises a pixel processing application, and graphics vertex application 202B comprises a vertex processing application.

In many cases, graphics pixel application 202A implements many functions that use a lower-precision (such as a half-precision) data format, but it may implement certain functions using a higher-precision (such as a full-precision) data format. Graphics pixel application 202A may also specify quad-based execution of instructions for pixel data. Typically, graphics vertex application 202B implements functions using a higher-precision data format, but may not specify quad-based execution of instructions for vertex data. Thus, different applications, such as applications 202A and 202B, and corresponding API's to graphics device 200, may specify different data precision requirements. And, within a given application 202A or 202B (and corresponding API), execution of mixed-precision instructions may be specified. For example, a shading language for graphics pixel application 202A may provide a precision modifier for shader instructions to be executed by shader processor 206. Thus, certain instructions may specify one precision level for execution while other instructions may specify another precision level. Shader processor 206 within graphics device 200 is capable of executing mixed-precision instructions in a uniform way.

In one aspect, shader processor 206 interacts with graphics applications 202A and 202B via one or more application program interfaces, or API's (not shown). For example, graphics pixel application 202A may interact with shader processor 206 via a first API, and graphics vertex application 202B may interact with shader processor 206 via a second API. The first API and second API may, in one aspect, comprise a common API. The API's may define one or more standard programming specifications used by graphics applications 202A and 202B to cause graphics device 200 to perform various graphical operations, including shading operations that may be performed by shader processor 206.

Graphics device 200 includes a shader processor 206. Shader processor 206 is capable of performing shading operations. Shader processor 206 is capable of exchanging pixel data with graphics pixel application 202A, and is further capable of exchanging vertex data with graphics vertex application 202B.

In the example of FIG. 2A, shader processor 206 also communicates with a texture engine 208 and a cache memory system 210. Texture engine 208 is capable of performing texture-related operations, and is also communicatively coupled to cache memory system 210. Cache memory system 210 is coupled to main memory 204. Cache memory system 210 includes both an instruction cache and a data cache in an aspect. Instructions and/or data may be loaded from main memory 204 into cache memory system 210, which are then made available to texture engine 208 and shader processor 206. Shader processor 206 may communicate with external devices or components via either a synchronous or an asynchronous interface.

In one aspect, shader processor 206 is capable of executing mixed-precision graphics instructions using different execution units. In this aspect, shader processor 206 includes one or more full-precision execution units along with one or more half-precision execution units. Shader processor 206 may invoke its execution units to execute graphics instructions for one or both of graphics applications 202A and 202B. Upon receipt of a binary instruction (such as from cache memory system 210), and also an indication of a data precision for execution of the instruction, shader processor 206 is capable of selecting an appropriate execution unit for executing the received instruction with the indicated data precision using graphics data. Graphics pixel application 202A may provide, for example, pixel data to shader processor 206, and graphics vertex application n202B may provide vertex data to shader processor 206.

Shader processor may also receive a separate conversion instruction that, when executed, converts graphics data associated with the graphics instruction to the indicated data precision. In one aspect, the conversion instruction is a separate instruction that is different from the graphics instruction.

Graphics data may also be loaded from main memory 204 or cache memory system 210, or may be provided by texture engine 208. Graphics pixel application 202A and/or graphics vertex application 202B invoke threads of execution which cause shader processor 206 to load one or more binary instructions from cache memory system 210 for execution. In one aspect, each loaded instruction indicates a data precision for execution of the instruction. In addition, shader processor 206 may execute the received conversion instruction to convert the graphics data associated with the instruction to the indicated data precision, if necessary. For example, if the provided graphics data has a data precision that is different from the indicated data precision, shader processor 206 may execute the conversion instruction to convert the graphics data to the indicated data precision, such that the graphics instruction may be executed by the selected execution unit. By selectively executing instructions in different execution units based upon indicated data precisions, shader processor 206 may avoid using a single execution unit to execute both full-precision and half-precision instructions.

Figure 2B:
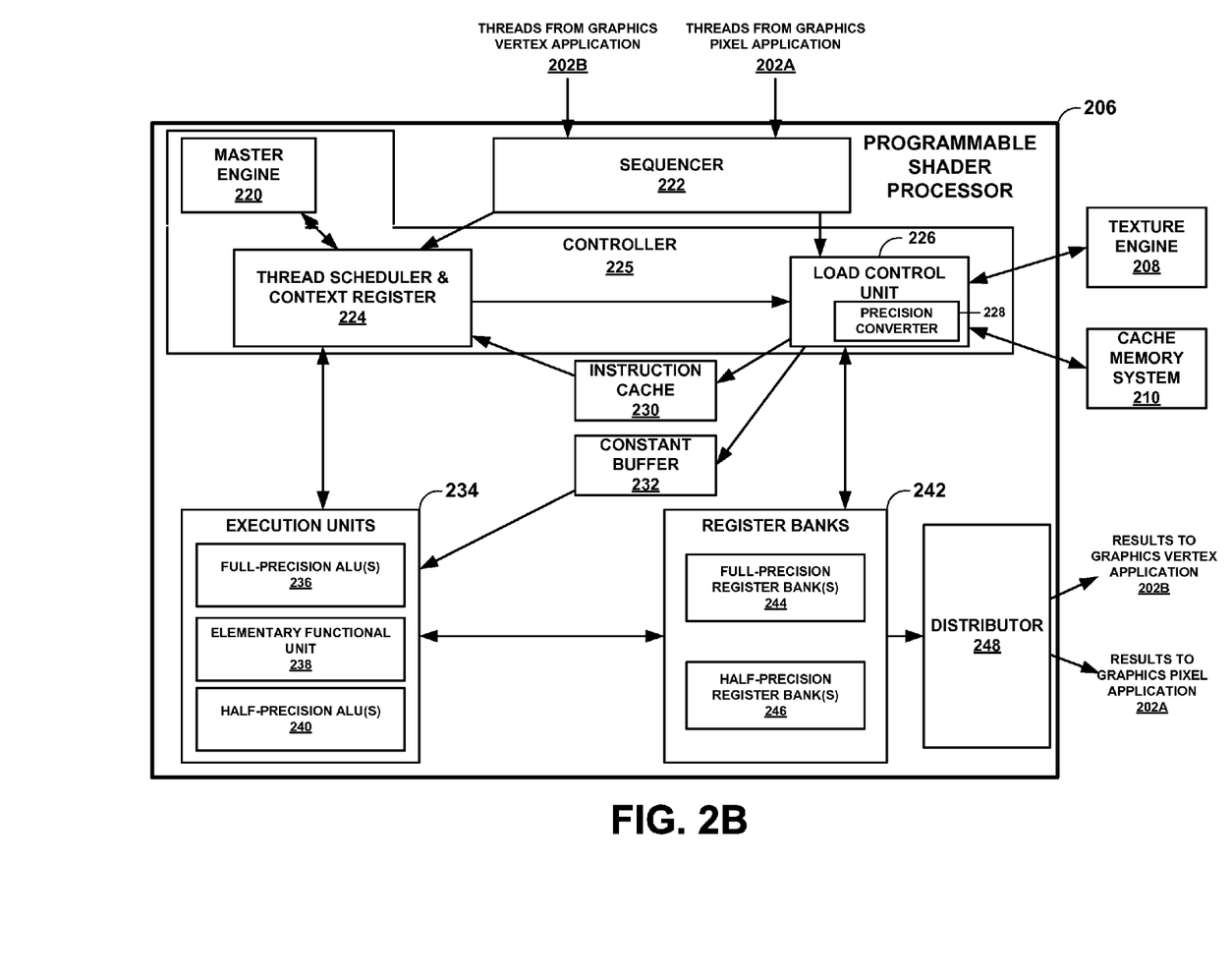
FIG. 2B is a block diagram illustrating further details of the shader processor shown in FIG. 2A, according to an aspect of the disclosure.

FIG. 2B is a block diagram illustrating further details of the shader processor 206 shown in FIG. 2A, according to one aspect. Within shader processor 206, a sequencer 222 receives threads from graphics applications 202A and 202B, and provides these threads to a thread scheduler & context register 224. In one aspect, sequencer 222 comprises a multiplexer (MUX). In one aspect, sequencer 222 determines which threads should be accepted, and may also allocate multiple-precision register space and/or other resources for each accepted thread. For example, sequencer 222 may allocate register space for half-precision instructions, and may also allocate register space for full-precision instructions.

In one aspect, pixel data received from graphics pixel application 202A includes attribute information in a pixel quad-based format (i.e., four pixels at a time). In this aspect, execution units 234 may process four pixels at a time. In one aspect, execution units 234 may process data from graphics vertex application 202B one vertex at a time.

Thread scheduler 224 performs various functions to schedule and manage execution of threads, and may control execution sequence of threads. For each thread, thread scheduler 224 may determine whether resources required for that thread are ready, push the thread into a sleep queue if any resource (e.g., instruction, register file, or texture read) for the thread is not ready, and move the thread from the sleep queue to an active queue when all of the resources are ready, according to one aspect. Thread scheduler 224 interfaces with a load control unit 226 in order to synchronize the resources for the threads. In one aspect, thread scheduler 224 is part of a controller 225. FIG. 2B shows an example of controller 225. Controller 225 may control various functions related to the processing of instructions and data within shader processor 206. In the example of FIG. 2B, controller 225 includes thread scheduler 224, load control unit 226, and master engine 220. In certain aspects, controller 225 includes at least one of master engine 220, thread scheduler 224, and load control unit 226.

Thread scheduler 224 also manages execution of threads. Thread scheduler 224 fetches instructions for each thread from an instruction cache 230, decodes each instruction if necessary, and performs flow control for the thread. Thread scheduler 224 selects active threads for execution, checks for read/write port conflict among the selected threads and, if there is no conflict, sends instructions for one thread to execution units 234, and sends instructions for another thread to load control unit 226. Thread scheduler 224 maintains a program/instruction counter for each thread and updates this counter as instructions are executed or program flow is altered. Thread scheduler 224 also issues requests to fetch for missing instructions from instruction cache 230 and removes threads that are completed.

In one aspect, thread scheduler 224 interacts with a master engine 220. In this aspect, thread scheduler 224 may delegate certain responsibilities to master engine 220. In one aspect, thread scheduler 224 may decode instructions for execution, or may maintain the program/instruction counter for each thread and update this counter as instructions are executed. In one aspect, master engine 220 sets up state for instruction execution, and may also control the state update sequence during instruction execution.

Instruction cache 230 stores instructions for the threads. These instructions indicate specific operations to be performed for each thread. Each operation may be, for example, an arithmetic operation, an elementary function, a memory access operation, or another form of instruction. Instruction cache 230 may be loaded with instructions from cache memory system 210 or main memory 204 (FIG. 2A), as needed, via load control unit 226. These instructions are binary instructions that have been compiled from graphics application code, according to one aspect. Each binary instruction indicates a data precision used for its execution within shader processor 206. For example, an instruction type associated with the instruction may indicate whether the instruction is a full-precision instruction or a half-precision instruction. Or, a particular flag or field within the instruction may indicate whether it is a full-precision or a half-precision instruction, according to one exemplary aspect. Thread scheduler 224 may be capable of decoding instructions and determining a data precision for each instruction (such as full- or half-precision). Thread scheduler 224 can then route each instruction to an execution unit that is capable of executing the instruction with the indicated data precision. This execution unit loads any graphics data needed for instruction execution from a constant buffer 232 or register banks 242, which are described in more detail below.

In the aspect shown in FIG. 2B, execution units 234 includes one or more full-precision ALU's (Arithmetic Logic Units) 236, one or more half-precision ALU's 240, and an elementary functional unit 238 that executes transcendental elementary operations. ALU's 236 and 240 may include one or more floating point units, which enable floating computations, and/or one or more integer logic units, which enable integer and logic operations. When necessary, execution units 234 load in data, such as graphics data, from constant buffer 232 or from register banks 242 during instruction execution. Both the full-precision ALU's 236 and the half-precision ALU's 240 are capable of performing arithmetic operations (such as addition, subtraction, multiplication, multiply and accumulate, etc.) and also logical operations (such as AND, OR, XOR, etc.). Each ALU unit may comprise a single quad ALU or four scalar ALU's, according to one aspect. When four scalar ALU's are used, attributes for four pixels may be processed in parallel by the ALU's. A quad ALU may be used to process four attributes for a pixel or a vertex in parallel. However, full-precision ALU's 236 execute instructions using full-precision calculations, while half-precision ALU's 240 execute instructions using half-precision calculations.

Elementary functional unit 238 can compute transcendental elementary functions such as sine, cosine, reciprocal, logarithm, exponential, square root, or reciprocal square root, which are widely used in shader instructions. Elementary functional unit 238 may improve shader performance by computing elementary functions in much less time than the time required to perform polynomial approximations of the elementary functions using simple instructions. Elementary functional unit 238 may be capable of executing instructions with full precision, but also may be capable of converting calculation results to a half-precision format as well, according to one aspect of this disclosure.

Load control unit 226, which is part of controller 225 in the exemplary aspect shown in FIG. 2B, controls the flow of data and instructions for various components within shader processor 206. In one aspect, load control unit 226 may evict excess internal data of shader processor 206 to external memory (e.g., cache memory system 210), and may fetch external resources such as instruction, buffer, or texture data from texture engine 208 and/or cache memory system 210. Load control unit 226 interfaces with cache memory system 210 and loads instruction cache 230, constant buffer 232 (which may store uniform data used during instruction execution for graphics applications 202A and/or 202B), and register banks 242 with data and instructions from cache memory system 210. Load control unit 226 also may provide output data from register banks 242 to cache memory system 210. Register banks 242 may receive the output data from one or more execution units 234, and can be shared amongst execution units 234. Load control unit 226 also interfaces with texture engine 208. In certain cases, texture engine 208 may provide data (such as texel data) to shader processor 206 via load control unit 226, and, in certain cases, load control unit 226 may provide data (such as texture coordinate data) and/or instructions (such as a sampler ID instruction) to texture engine 208.

In the example of FIG. 2B, load control unit 226 also includes a precision converter 228. Because the data read into or written out of load control unit 226 may have different data precisions (e.g., full precision, half precision), load control unit 226 may need to convert certain data to a different data precision level before routing it to a different component (such as to register banks 242, or to cache memory system 210). Precision converter 228 manages such data conversion within load control unit 226.

In one aspect, precision converter 228 operates to convert graphics data from one precision level to another precision level upon execution, by shader processor 206, of a received conversion instruction. When executed, the conversion instruction converts graphics data associated with a received graphics instruction to an indicated data precision. For example, the conversion instruction may convert data in a half-precision format to a full-precision format, or vice versa.

Constant buffer 232 may store constant values that are used by execution units 234 during instruction execution. Register banks 242 store temporary results as well as final results from execution units 234 for executed threads. Register banks 242 include one or more full-precision register banks 244 and one or more half-precision register banks 246. Final execution results can be read from register banks 242 by load control unit 226. In addition, a distributor 248 may also receive the final results for the executed threads from register banks 242 and distribute these results to at least one of graphics vertex application 202B and graphics pixel application 202A.

Graphics applications, such as applications 202A and 202B, may require processing of data using different precision levels. For example, in one aspect, graphics vertex application 202B processes vertex data using full-precision data formats, while graphics pixel application 202A processes pixel data using half-precision formats. In one aspect, graphics pixel application 202A processes certain information using half-precision format, yet processes other information using full-precision format. During execution of threads from graphics vertex application 202B and graphics pixel application 202A, shader processor 206 receives and processes instructions from instruction cache 230 that use different data precision levels for execution.

Thus, in the aspect shown in FIG. 2B, thread scheduler 224 identifies a data precision indicated or associated with a given instruction loaded out of instruction cache 230, and routes the instruction to an appropriate execution unit. For example, if the instruction is decoded as a full-precision instruction (such as through indication by the instruction type or a field/header contained within the instruction), thread scheduler 224 is capable of routing the instruction to one of the full-precision ALU's 236 for execution. Execution results from full precision ALU's 236 may be stored in one or more of the full-precision register banks 244 and provided back to the graphics application (such as graphics vertex application 202B) via distributor 248. If, however, an instruction from the instruction cache 230 is decoded by thread scheduler 224 as a half-precision instruction, thread scheduler 224 is capable of routing the instruction to one of the half-precision ALU's 240 for execution. Execution results from half-precision ALU's 240 may be stored in one or more of the half-precision register banks 246 and provided back to the graphics application (such as graphics pixel application 202A) via distributor 248.

Figure 2C:
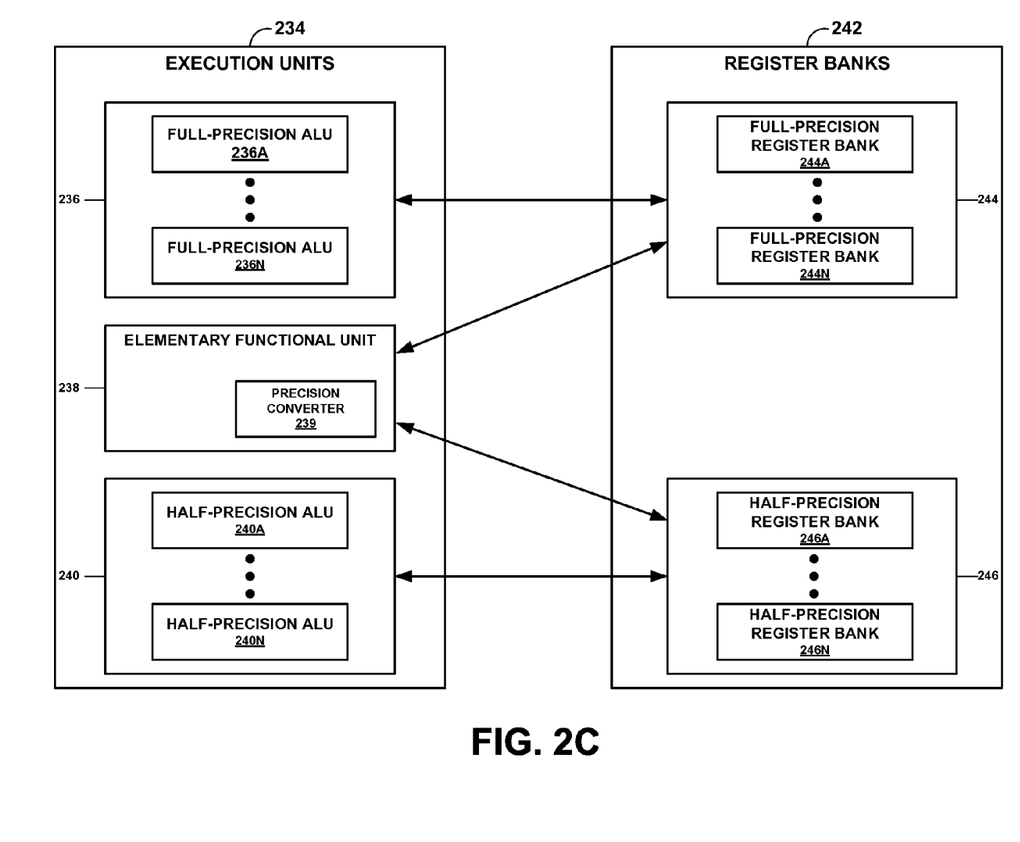
FIG. 2C is a block diagram illustrating further details of the execution units and register banks shown in FIG. 2B, according to an aspect of the disclosure.

FIG. 2C is a block diagram illustrating further details of the execution units 234 and register banks 242 shown in FIG. 2B, according to one aspect. As described previously, execution units 234 include various different types of execution units. In the example of FIG. 2C, execution units 234 includes one or more full-precision ALU's 236A-236N, one or more half-precision ALU's 240A-240N, and one or more elementary functional units 238. Each full-precision ALU 236A-236N is capable of using data to execute instructions using full-precision computations. Input data used during instruction execution may be retrieved from one or more of full-precision register banks 244A-244N (within register banks 242). In addition, computation results generated during instruction execution by full-precision ALU's 236A-236N may be stored within one or more of full-precision register banks 244A-244N.

Similarly, each half-precision ALU 240A-240N is capable of using data to execute instructions using half-precision computations. Input data used during instruction execution may be retrieved from one or more of half-precision register banks 246A-246N. In addition, computation results generated during instruction execution by half-precision ALU's 240A-240N may be stored within one or more of half-precision register banks 246A-246N.

As described previously, elementary functional unit 238 is capable of executing full-precision instructions, but storing results in half-precision format. In one aspect, elementary functional unit 238 is capable of storing result data in either full- or half-precision format. As a result, elementary functional unit 238 is communicatively coupled to full-precision register banks 244A-244N, and is also communicatively coupled to half-precision register banks 246A-246N. Elementary functional unit 238 may both retrieve intermediate data from and store final result data to any of the registers within register banks 242, according to one aspect.

In addition, elementary functional unit 238 includes a precision converter 239. In those instances in which elementary functional unit 238 converts between full- and half-precision data formats, it may use precision converter 239 to perform the conversion. For example, unit 238 may load input graphics data from half-precision register banks 246A and use the data to execute a full-precision instruction. Precision converter 239 may convert the input data from a half-precision format to a full-precision format. Unit 238 may then use the converted data to execute the full-precision instruction. If the result data is to be stored back into half-precision register bank 246A, precision converter 239 may convert the result data from a full-precision to a half-precision format, such that it may be stored in half-precision register bank 246A. Alternatively, if the result data is to be stored in one of full-precision register banks 244A-244N, the result data in full-precision format may be directly stored in one of these registers.

Thread scheduler 224 (FIG. 2B) is capable of causing a binary instruction to be loaded from instruction cache 230 and executed in one of execution units 234 based upon the data precision associated with the instruction. For example, thread scheduler 224 may route full-precision instructions to one or more of full-precision ALU's 236A-236N, and may route half-precision instructions to one or more of half-precision ALU's 240A-240N. Thread scheduler 224 may also route elementary instructions to elementary functional unit 238 for execution. Result data can be stored in corresponding registers within register banks 242. In one aspect, data transitions between full-precision ALU's 236A-236N, elementary functional unit 238, and half-precision ALU's 240A-240N go through register banks 242.

In one aspect, each half-precision register bank 246A-246N contains less register storage space, and occupies less physical space on an integrated circuit, than each full-precision register bank 244A-244N. Thus, for example, half-precision register bank 246A contains less register storage space, and occupies a smaller physical space, than full-precision register bank 244A. In one aspect, one full-precision register bank (such as bank 244A) may contain substantially the same amount of register space, and occupy substantially the same amount of physical space, as two half-precision register banks (such as banks 246A and 246B combined).

Similarly, each full-precision ALU 236A-236N may occupy more physical space within an integrated circuit than each half-precision ALU 240A-240N. In addition, each full-precision ALU 236A-236N typically may use more operating power than each half-precision ALU 240A-240N. As a consequence, in certain aspects, it may be desired to limit the number of full-precision ALU's and full-precision register banks, and increase the number of half-precision ALU's and half-precision register banks, that are used, so as to minimize integrated circuit size and reduce power consumption requirements. These aspects may be particularly appropriate or beneficial when shader processor 206 is part of a smaller computing device with certain power constraints, such as a mobile or wireless communication device (e.g., such as a mobile radiotelephone or wireless communication device handset), or a digital camera or video device.

Therefore, in one aspect, execution units 234 may include only one full-precision ALU 236A, and register banks 242 may include only one full-precision register bank 244A. In this aspect, execution units 234 may further include four half-precision ALU's 240A-240D, while register banks 242 may include four half-precision register banks 246A-246D. As a result, execution units 234 may be capable of executing at least one half-precision instruction and one full-precision instruction in parallel. For example, the four half-precision ALU's 240A-240D may execute instructions for attributes of four pixels at a time. Because only one full precision ALU 236A is used, ALU 236A is capable of executing an instruction for one vertex at a time, according to one aspect. As a result, shader processor 206 need not utilize a vertex packing buffer to pack data for multiple vertexes, according to one aspect. In this case, vector-based attribute data for a vertex may be directly processed without having to convert the data to scalar format.

In another aspect, execution units 234 may include four full-precision ALU's 236A-236D, and register banks 242 may include four full-precision register banks 244A-244D. In this aspect, execution units 234 may further include eight half-precision ALU's 240A-240H, while register banks 242 may include eight half-precision register banks 246A-246H. As a result, execution units 234 are capable of executing, for example, two half-precision instructions on two quads and one full-precision instruction on one quad in parallel. Each quad, or thread, is a group of four pixels or four vertices.

In another aspect, execution units 234 may include four full-precision ALU's 236A-236D, and register banks 242 may include four full-precision register banks 244A-244D. In this aspect, execution units 234 further includes four half-precision ALU's 240A-240H, while register banks 242 includes four half-precision register banks 246A-246H. Various other combinations of full-precision ALU's 236A-236N, full-precision register banks 244A-244N, half-precision ALU's 240A-240N, and half-precision register banks 246A-246N may be used.

In one aspect, shader processor 206 may be capable of using thread scheduler 224 to selectively power down, or disable, one or more of full-precision ALU's 236A-236N and one or more of full-precision register banks 244A-244N. In this aspect, although shader processor 206 includes various full-precision components (such as full-precision ALU's 236A-236N and full-precision register banks 244A-244N) within one or more integrated circuits, it may save, or reduce, power consumption by selectively powering down, or disabling, one or more of these full-precision components when they are not being used. For example, in certain scenarios, shader processor 206 may determine that one or more of these components are not being used, given that various binary instructions that are loaded are to be executed by one or more of half-precision ALU's 240A-240N. Thus, in these types of scenarios, shader processor 206 may selectively power down, or disable, one or more of the full-precision components for power savings. In this manner, shader processor 206 may selectively power down or disable one or more full-precision components on a dynamic basis as a function of the types and numbers of instructions being processed at a given time.

In one aspect, shader processor 206 may also be capable of using thread scheduler 224 to selectively power down, or disable, one or more of half-precision ALU's 240A-240N and one or more of half-precision register banks 246A-246N. In this aspect, shader processor 206 may save, or reduce, power consumption by selectively powering down, or disabling, one or more of these half-precision components when they are not being used or not needed.

Shader processor 206 may provide various benefits and advantages. For example, shader processor 206 may provide a highly flexible and adaptive interface to satisfy different requirements for execution of mixed-precision instructions, such as full-precision and half-precision instructions. Shader processor 206 may significantly reduce power consumption by avoiding unnecessary precision promotion during execution of mixed-precision instructions. (Precision promotion may occur when shader processor 206 dynamically converts data from a lower precision format, such as a half-precision format, to a higher-precision format, such as a full-precision format. Precision promotion can require additional circuitry within shader processor 206, and also may cause shader core processes to expend additional clock cycles.) Because thread scheduler 224 is capable of recognizing data precisions associated with binary instructions loaded from instruction cache 230, thread scheduler 224 is capable of routing the instruction to an appropriate execution unit within execution units 234 for execution, such as full-precision ALU 236A or half-precision ALU 240A.

Shader processor 206 also may reduce overall register file size in register banks 242 and ALU size in execution units 234 by utilizing fewer full-precision components and by instead utilizing more half-precision components (e.g., ALU's and register banks). In addition, shader processor 206 may increase overall system performance by increasing processing capacity.

In view of the various potential benefits related to lower power consumption and increased performance, shader processor 206 may be used in various different types of systems or devices, such as wireless communications devices, digital camera devices, video recording or display devices, video game devices, or other graphics and multimedia devices. Such devices may include a display to present graphics content generated using shader processor 206. In one aspect, the precision flexibility offered by shader processor 206 allows it to be used with various devices, including multimedia devices, which may provide lower-precision calculations or have lower power requirements than certain other graphics applications.

Figure 3:
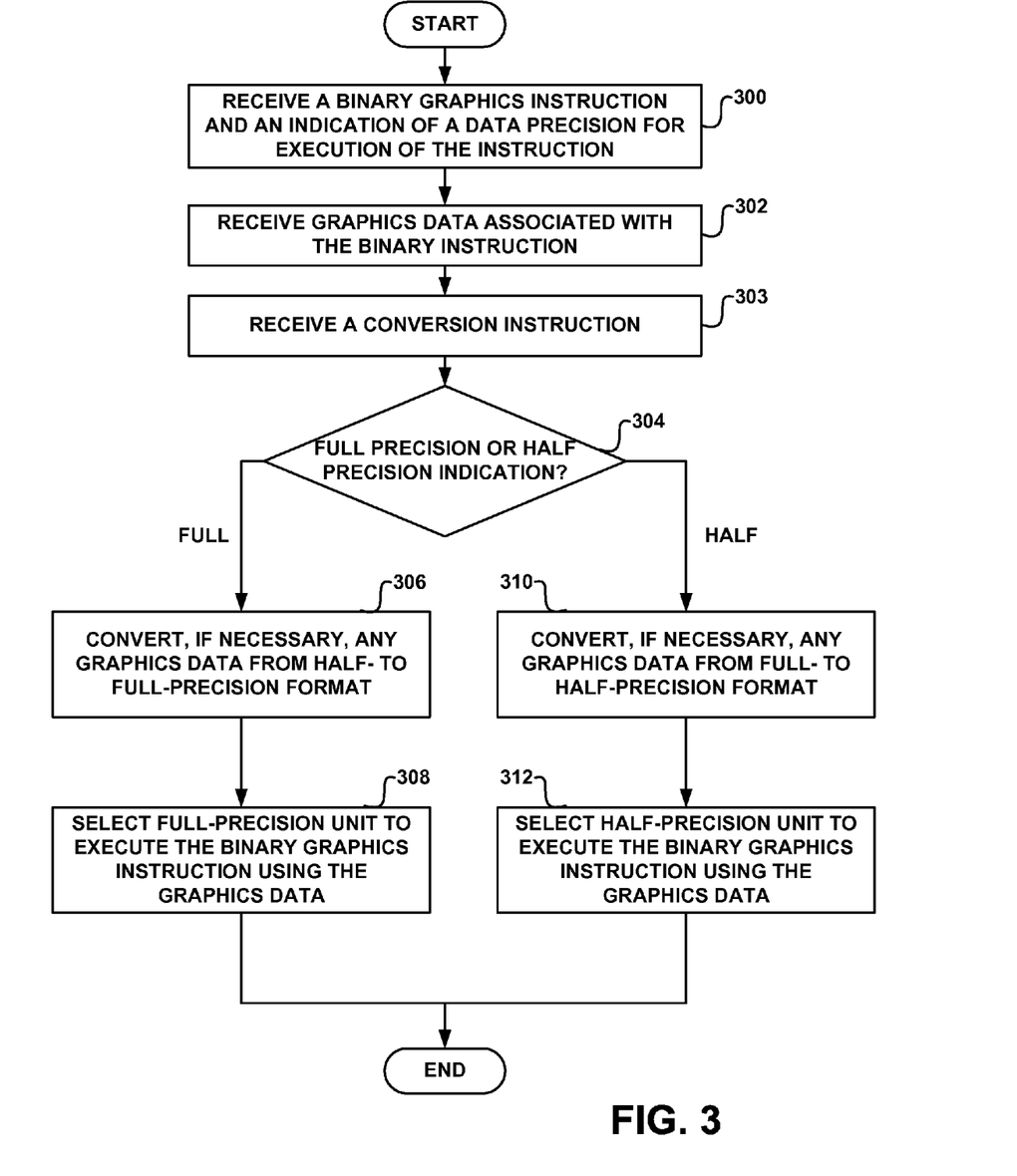
FIG. 3 is a flow diagram illustrating an exemplary method that may be performed by the shader processor shown in FIGS. 2A-2B, according to an aspect of the disclosure.

FIG. 3 is a flow diagram illustrating an exemplary method that may be performed by the shader processor 206 shown in FIGS. 2A-2B, according to one aspect. In this aspect, the exemplary method includes acts 300, 302, 303, 306, 308, 310, and 312, and also includes a decision point 304.

In act 300, shader processor 206 receives a binary graphics instruction and an indication of a data precision for execution of the instruction. For example, as previously described, thread scheduler 224 may load the instruction from instruction cache 230 (FIG. 2B). In one aspect, decoding of the instruction, by thread scheduler 224, provides information as to the data precision for execution of the instruction. For example, the instruction may be a full-precision or a half-precision instruction.

In act 302, shader processor 206 receives graphics data associated with the binary instruction. For example, sequencer 222 may receive vertex data from graphics vertex application 202B, and/or may receive pixel data from graphics pixel application n202A. In certain scenarios, load control unit 226 may also load graphics data associated with the instruction from cache memory system 210. In act 303, shader processor 206 further receives a conversion instruction that, if executed, converts the graphics data associated with the binary instruction to the indicated data precision.

At decision point 304, shader processor 206 determines whether the instruction is a full-precision or a half-precision instruction. As noted above, in one aspect, thread scheduler 224 may decode the instruction and determine whether it is a full-precision or half-precision instruction.

If the instruction is a full-precision instruction, shader processor 206, in act 306, converts, if necessary, any received graphics data from half- to full-precision format. In certain cases, the received graphics data, as stored in cache memory system 210 or as processed from graphics application 202A or 202B, may have a half-precision format. In this case, the graphics data is converted to a full-precision format so that it may be used during execution of the full-precision instruction. In one aspect, precision converter 228 of load control unit 226 may manage data format conversion when the received conversion instruction is executed by shader processor 206. In act 308, shader processor 206 selects a full-precision unit, such as unit 236A (FIG. 2C), to execute the binary instruction using the graphics data.

If, however, the instruction is a half-precision instruction, shader processor, in act 310, converts, if necessary, any data from full- to half-precision format. In one aspect, precision converter 228 may manage data format conversion when the received conversion instruction is executed by shader processor 206. In act 312, shader processor 206 then selects a half-precision unit, such as unit 240A (FIG. 2C) to execute the binary instruction using the graphics data.

Figure 4:
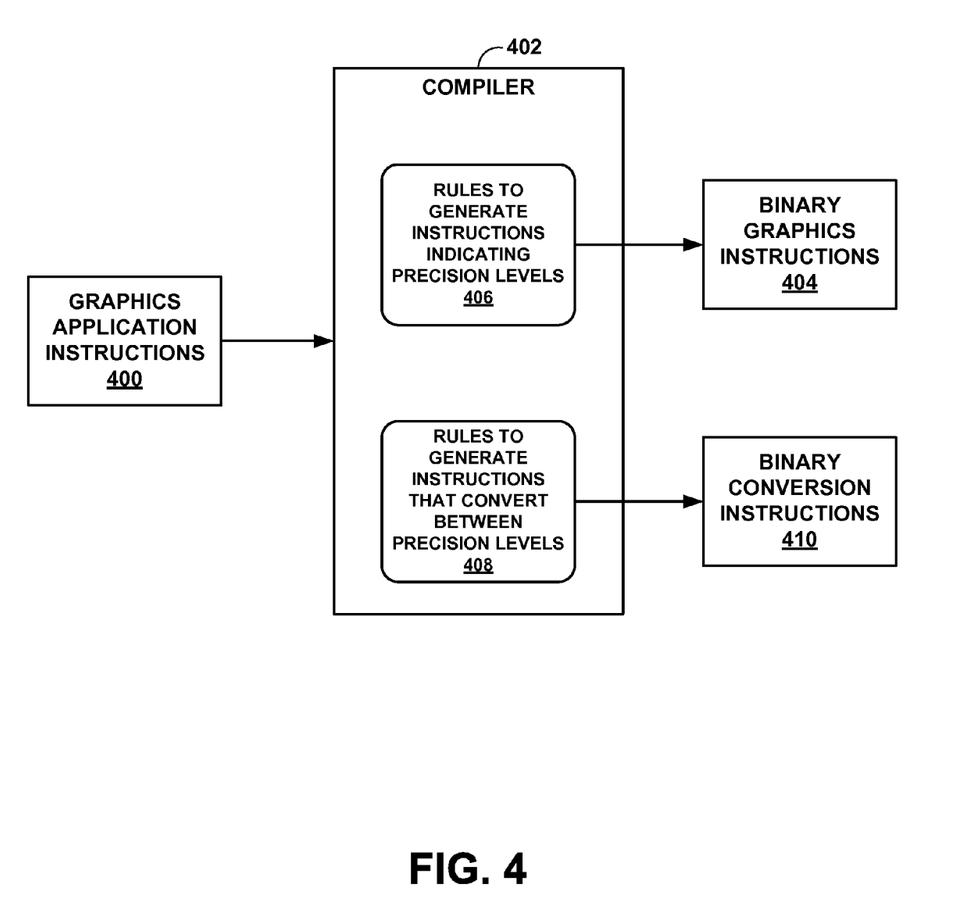
FIG. 4 is a block diagram illustrating a compiler that may be used to generate graphics instructions to be executed by the streaming processor shown in FIG. 1 or by the shader processor shown in FIGS. 2A-2B, according to an aspect of the disclosure.

FIG. 4 is a block diagram illustrating a compiler 402 that may be used to generate instructions to be executed by streaming processor 106 shown in FIG. 1 or by shader processor 206 shown in FIGS. 2A-2B, according to one aspect. In one example aspect, compiler 402 is used to generate instructions to be executed by shader processor 206. In this aspect, application developers may use compiler 402 to generate binary instructions (code) for execution by shader processor 206. Shader processor 206 is part of graphics device 200 (FIG. 2A). Application developers may have access to an application development platform for use with graphics device 200, and may create application-level software for graphics pixel application 202A and/or graphics vertex application 202B. Such application-level software includes graphics application instructions 400 shown in FIG. 4. Graphics application instructions 400 may include instructions written by high-level shading languages, compliant with or translatable to DirectX®, OpenGL®, OpenVG™, or other languages. In one aspect, these shading languages define one or more standard API's that may be used for developing programming code to perform graphics operations.

Compiler 402 may be supported, at least in part, by compiler software executed by a processor to receive and process source code instructions and compile such instructions to produce compiled instructions (e.g., in the form of binary, executable machine instructions). Accordingly, compiler 402 may be formed by one or more processors executing computer-readable instructions associated with the compiler software. In one aspect, these one or more processors may be part of, or implemented in, the application development platform used by application developers. The compiled instructions may be stored on a computer-readable data storage medium for retrieval and execution by one or more processors, such as streaming processor 106 or shader processor 206. For example, the disclosure contemplates a computer-readable data storage medium including one or more first executable instructions, one or more second executable instructions, and one or more third executable instructions.

The first executable instructions, when executed by a processor, may support one or more functions of a graphics application. In addition, each of the first executable instructions may indicate a first data precision level for its execution. The second executable instructions, when executed by a processor, may support one or more functions of the graphics application. In addition, each of the second executable instructions may indicate a second data precision level different from the first data precision level for its execution. The third executable instructions, when executed by the processor, may also support one or more functions of the graphics application, wherein each of the third executable instructions converts graphics data from the second data precision level to the first data precision level when the one or more first executable instructions are executed Compiler 402 may be capable of compiling graphics application instructions 400 into binary graphics instructions 404, which are then capable of being executed by shader processor 206. Shader processor 206 may retrieve such instructions from a data storage media such as a memory or data storage device, and execute these instructions to perform computations and other operations in support of a graphics application. Several of graphics applications instructions 400 may specify a particular data precision level for execution. For example, certain instructions may specify that they use full-precision or half-precision operations or calculations. Compiler 402 may be configured to apply rules 406 to analyze and parse graphics application instructions 400 during the compilation process and generate corresponding binary instructions graphics 404 that indicate data precision levels for execution of instructions 404.

Thus, if one of graphics application instructions 400 specifies a full-precision operation or calculation, rules 406 of compiler 402 may generate one or more of binary instructions 404 that are full-precision instructions. If another one of graphics application instructions 400 specifies a half-precision operation or calculation, rules 406 generate one or more of binary instructions 404 that are half-precision instructions. In one aspect, binary instructions 404 each may include an 'opcode' indicating whether the instruction is a full-precision or a half-precision instruction. In one aspect, binary instructions 404 each may indicate a data precision for execution of the instruction using information contained within another predefined field, flag, or header, of the instruction that may be decoded by shader processor 206. In one aspect, the data precision may be inferred based upon the type of instruction to be executed.

Compiler 402 also includes rules 408 that are capable of generating binary conversion instructions 410 that convert between different data precision levels. During compilation, these rules 408 of compiler 402 may determine that such conversion may be necessary during execution of binary instructions 404. For example, rules 408 may generate one or more instructions within conversion instructions 410 that convert data from a full-precision format to a half-precision format. This conversion may be required when shader processor 206 executes half-precision instructions within graphics instructions 404. Rules 408 may also generate one or more instructions within conversion instructions 410 that convert data from a half-precision to a full-precision format, which may be required when shader processor 206 executes full-precision instructions within graphics instructions 404.

When rules 408 of compiler 402 generate conversion instructions 410, shader processor 206 may execute these conversion instructions 410 to manage data precision conversion during execution of corresponding graphics instructions 404, according to one aspect. In this aspect, execution of conversion instructions 410 manages such precision conversion, such that shader processor 206 need not necessarily use certain hardware conversion mechanisms to convert data from one precision level to another. Conversion instructions 410 may also allow more efficient data transfer to ALU's using different precision levels, such as to full-precision ALU's 236 and to half-precision ALU's 240.

The components and techniques described herein may be implemented in hardware, software, firmware, or any combination thereof. Any features described as modules or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such an integrated circuit device may be used in any of a variety of graphics applications and devices. In some aspects, for example, such components may form part of a mobile device, such as a wireless communication device handset.

If implemented in software, the techniques may be realized at least in part by a computer-readable medium comprising instructions that, when executed by one or more processors, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media.

The techniques additionally, or alternatively, may be realized at least in part by a computer-readable communication medium that carries or communicates code in the form of instructions or data structures and that can be accessed, read, and/or executed by one or more processors. Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Any software that is utilized may be executed by one or more processors, such as one or more digital signal processors (DSP's), general purpose microprocessors, application specific integrated circuits (ASIC's), field-programmable gate arrays (FPGA's), or other equivalent integrated or discrete logic circuitry. Accordingly, the terms "processor" or "controller," as used herein, may refer to any of the foregoing structures or any other structure suitable for implementation of the techniques described herein. Hence, the disclosure also contemplates any of a variety of integrated circuit devices that include circuitry to implement one or more of the techniques described in this disclosure. Such circuitry may be provided in a single integrated circuit chip device or in multiple, interoperable integrated circuit chip devices.

Various aspects of the disclosure have been described. These and other aspects are within the scope of the following claims.

The invention claimed is:

1. A method comprising:
receiving a graphics instruction for execution within a programmable streaming processor;
receiving an indication of a data precision for execution of the graphics instruction, wherein the indication of the data precision is contained within the graphics instruction, wherein the graphics instruction is a first executable instruction generated by a compiler that compiles graphics application instructions;
receiving a conversion instruction that, when executed by the programmable streaming processor, converts graphics data, associated with the graphics instruction, from a first data precision to converted graphics data having the indicated data precision, and wherein the conversion instruction is different than the graphics instruction, wherein the conversion instruction is generated by the compiler;
selecting one of a plurality of execution units within the processor based on the indicated data precision; and
using the selected execution unit to execute the graphics instruction with the indicated data precision using the converted graphics data associated with the graphics instruction.

2. The method of claim 1, further comprising:
receiving the graphics data associated with the graphics instruction;
generating a computation result with the indicated data precision during execution of the graphics instruction by the selected execution unit; and
providing the computation result as output.

3. The method of claim 1, wherein selecting one of the plurality of execution units comprises:
selecting one of a first set of one or more execution units within the processor that each execute instructions with the first data precision using the graphics data when the indicated data precision is the first data precision; and
selecting one of a second set of one or more execution units within the processor that each execute instructions with a second data precision using the graphics data when the indicated data precision is the second data precision, the second data precision being different than the first data precision.

4. The method of claim 3, wherein the first data precision comprises a full data precision, and wherein the second data precision comprises a half data precision.

5. The method of claim 1, wherein the execution units include a first set of one or more execution units within the processor that each execute instructions with the first data precision using the graphics data, and further include a second set of one or more execution units within the processor that each execute instructions with a second data precision different than the first data precision using the graphics data.

6. The method of claim 5, wherein:
selecting one of the plurality of execution units within the processor based on the indicated data precision comprises selecting one of the execution units in the first set; and using the selected execution unit to execute the graphics instruction comprises using the selected execution unit in the first set to execute the graphics instruction with the indicated data precision using the graphics data associated with the graphics instruction.

7. The method of claim 6, further comprising:
receiving a second graphics instruction for execution within the processor;
receiving an indication of the second data precision for execution of the second graphics instruction;
receiving a second conversion instruction that, when executed by the processor, converts graphics data associated with the second graphics instruction to the indicated second data precision, the second conversion instruction being different than the second graphics instruction;
selecting one of the execution units in the second set based on the indicated second data precision; and
using the selected execution unit in the second set to execute the second graphics instruction with the indicated second data precision using the graphics data associated with the second graphics instruction.

8. The method of claim 1, wherein receiving the indication of the data precision for execution of the graphics instruction comprises decoding the graphics instruction to determine the data precision.

9. The method of claim 1, wherein the graphics data associated with the graphics instruction comprises at least one of vertex graphics data and pixel graphics data.

10. A non-transitory computer-readable storage medium comprising instructions for causing a programmable streaming processor to:
receive a graphics instruction for execution within the programmable streaming processor;
receive an indication of a data precision for execution of the graphics instruction, wherein the indication of the data precision is contained within the graphics instruction, wherein the graphics instruction is a first executable instruction generated by a compiler that compiles graphics application instructions;
receive a conversion instruction that, when executed by the processor, converts graphics data, associated with the graphics instruction, from a first data precision to converted graphics data having the indicated data precision, and wherein the conversion instruction is different than the graphics instruction, wherein the conversion instruction is generated by the compiler;
select one of a plurality of execution units within the processor based on the indicated data precision; and
use the selected execution unit to execute the graphics instruction with the indicated data precision using the converted graphics data associated with the graphics instruction.

11. The non-transitory computer-readable storage medium of claim 10, further comprising instructions for causing the processor to:
receive the graphics data associated with the graphics instruction;
generate a computation result with the indicated data precision during execution of the graphics instruction by the selected execution unit; and
provide the computation result as output.

12. The non-transitory computer-readable storage medium of claim 10, wherein the instructions for causing the processor to select one of the plurality of execution units comprise instructions for causing the processor to:
select one of a first set of one or more execution units within the processor that each execute instructions with the first data precision using the graphics data when the indicated data precision is the first data precision; and
select one of a second set of one or more execution units within the processor that each execute instructions with a second data precision using the graphics data when the indicated data precision is the second data precision, the second data precision being different than the first data precision.

13. The non-transitory computer-readable storage medium of claim 12, wherein the first data precision comprises a full data precision, and wherein the second data precision comprises a half data precision.

14. The non-transitory computer-readable storage medium of claim 10, wherein the execution units include a first set of one or more execution units within the processor that each execute instructions with the first data precision using the graphics data, and further include a second set of one or more execution units within the processor that each execute instructions with a second data precision different than the first data precision using the graphics data.

15. The non-transitory computer-readable storage medium of claim 14, wherein:
the instructions for causing the processor to select one of the plurality of execution units within the processor based on the indicated data precision comprise instructions for causing the processor to select one of the execution units in the first set; and
the instructions for causing the processor to use the selected execution unit to execute the instruction comprise instructions for causing the processor to use the selected execution unit in the first set to execute the graphics instruction with the indicated data precision using the graphics data associated with the graphics instruction.

16. The non-transitory computer-readable storage medium of claim 15, further comprising instructions for causing the processor to:
receive a second graphics instruction for execution within the processor;
receive an indication of the second data precision for execution of the second graphics instruction;
receive a second conversion instruction that, when executed by the processor, converts graphics data associated with the second graphics instruction to the indicated second data precision, the second conversion instruction being different than the second graphics instruction;
select one of the execution units in the second set based on the indicated second data precision; and
use the selected execution unit in the second set to execute the second graphics instruction with the indicated second data precision using the graphics data associated with the second graphics instruction.

17. The non-transitory computer-readable storage medium of claim 10, wherein the instructions for causing the processor to receive the indication of the data precision for execution of the graphics instruction comprise instructions for causing the processor to decode the graphics instruction to determine the data precision.

18. The non-transitory computer-readable storage medium of claim 10, wherein the graphics data associated with the graphics instruction comprises at least one of vertex graphics data and pixel graphics data.

19. A device comprising:
a controller configured to receive a graphics instruction for execution within a programmable streaming processor, wherein the indication of the data precision is contained within the graphics instruction and wherein the graphics instruction is a first executable instruction generated by a compiler that compiles graphics application instructions, to receive an indication of a data precision for execution of the graphics instruction, and to receive a conversion instruction that, when executed by the programmable streaming processor, converts graphics data associated, with the graphics instruction, from a first data precision to converted graphics data having a second data precision, wherein the conversion instruction is different than the graphics instruction and wherein the conversion instruction is generated by the compiler; and
a plurality of execution units within the processor,
wherein the controller is configured to select one of the execution units based on the indicated data precision and cause the selected execution unit to execute the graphics instruction with the indicated data precision using the converted graphics data associated with the graphics instruction.

20. The device of claim 19, wherein the plurality of execution units includes a first execution unit configured to execute instructions with the indicated data precision and a second execution unit configured to execute instructions with a second data precision that is different from the indicated data precision, and wherein the controller is configured to select the first execution unit to execute the graphics instruction with the indicated data precision using the graphics data.

21. The device of claim 19, wherein the plurality of execution units includes one or more full-precision execution units and at least four half-precision execution units.

22. The device of claim 21, wherein when the indicated data precision for execution of the graphics instruction comprises a full precision, the controller is configured to select one of the full-precision execution units to execute the graphics instruction using the graphics data.

23. The device of claim 21, wherein when the indicated data precision for execution of the graphics instruction comprises a half precision, the controller is configured to select one of the half-precision execution units to execute the graphics instruction using the graphics data.

24. The device of claim 21, further comprising:
at least one full-precision register bank to store computation results when the at least one full-precision execution unit executes instructions; and
at least four half-precision register banks to store computation results when the at least four half-precision execution units execute instructions.

25. The device of claim 19, wherein the plurality of execution units includes at least one full-precision execution unit and at least one half-precision execution unit, and wherein when the indicated data precision for execution of the graphics instruction comprises a half precision, the controller is configured to shut down power to the at least one full-precision execution unit and cause the at least one half-precision execution unit to execute the graphics instruction using the graphics data.

26. The device of claim 19, wherein the processor comprises a shader processor.

27. The device of claim 19, wherein the device comprises a wireless communication device handset.

28. The device of claim 19, wherein the device comprises one or more integrated circuit devices.

29. A device comprising:
means for receiving a graphics instruction for execution within a programmable streaming processor;
means for receiving an indication of a data precision for execution of the graphics instruction, wherein the indication of the data precision is contained within the graphics instruction, wherein the graphics instruction is a first executable instruction generated by a compiler that compiles graphics application instructions;
means for receiving a conversion instruction that, when executed by the programmable streaming processor, converts graphics data associated, with the graphics instruction, from a first data precision to converted graphics data having the indicated data precision, and wherein the conversion instruction is different than the graphics instruction, wherein the conversion instruction is generated by the compiler;
means for selecting one of a plurality of execution units within the processor based on the indicated data precision; and
means for using the selected execution unit to execute the graphics instruction with the indicated data precision using the converted graphics data associated with the graphics instruction.

30. The device of claim 29, further comprising:
means for receiving the graphics data associated with the graphics instruction;
means for generating a computation result with the indicated data precision during execution of the graphics instruction by the selected execution unit; and
means for providing the computation result as output.

31. The device of claim 29, wherein the means for selecting one of the plurality of execution units comprises:
means for selecting one of a first set of one or more execution units within the processor that each execute instructions with the first data precision using the graphics data when the indicated data precision is the first data precision; and
means for selecting one of a second set of one or more execution units within the processor that each execute instructions with a second data precision using the graphics data when the indicated data precision is the second data precision, the second data precision being different than the first data precision.

32. The device of claim 31, wherein the first data precision comprises a full data precision, and wherein the second data precision comprises a half data precision.

33. The device of claim 29, wherein the execution units include a first set of one or more execution units within the processor that each execute instructions with the first data precision using the graphics data, and further include a second set of one or more execution units within the processor that each execute instructions with a second data precision different than the first data precision using the graphics data.

34. The device of claim 33, wherein:
the means for selecting one of the plurality of execution units within the processor based on the indicated data precision comprises means for selecting one of the execution units in the first set; and
the means for using the selected execution unit to execute the graphics instruction comprises means for using the selected execution unit in the first set to execute the graphics instruction with the indicated data precision using the graphics data associated with the graphics instruction.

35. The device of claim 34, further comprising:
means for receiving a second graphics instruction for execution within the processor;
means for receiving an indication of the second data precision for execution of the second graphics instruction;
means for receiving a second conversion instruction that, when executed by the processor, converts graphics data associated with the second graphics instruction to the indicated second data precision, the second conversion instruction being different than the second graphics instruction;
means for selecting one of the execution units in the second set based on the indicated second data precision; and
means for using the selected execution unit in the second set to execute the second graphics instruction with the indicated second data precision using the graphics data associated with the second graphics instruction.

36. The device of claim 29, wherein the means for receiving the indication of the data precision for execution of the graphics instruction comprises means for decoding the graphics instruction to determine the data precision.

37. The device of claim 29, wherein the graphics data associated with the graphics instruction comprises at least one of vertex graphics data and pixel graphics data.

38. A device comprising:
a programmable streaming processor; and
at least one memory module coupled to the programmable streaming processor,
wherein the programmable streaming processor comprises:
a controller configured to receive a graphics instruction for execution from the at least one memory module, to receive an indication of a data precision for execution of the graphics instruction, wherein the indication of the data precision is contained within the graphics instruction and wherein the graphics instruction is a first executable instruction generated by a compiler that compiles graphics application instructions, and to receive a conversion instruction that, when executed by the processor, converts graphics data, associated with the graphics instruction, to converted graphics data, wherein the graphics data has a first data precision and the converted graphics data has the indicated data precision, and wherein the conversion instruction is different than the graphics instruction and wherein the conversion instruction is generated by the compiler; and
a plurality of execution units that are configured to execute instructions,
wherein the controller is configured to select one of the execution units based on the indicated data precision and cause the selected execution unit to execute the graphics instruction with the indicated data precision using the converted graphics data associated with the graphics instruction.

39. The device of claim 38, further comprising at least one graphics engine coupled to the processor.

40. The device of claim 38, wherein the plurality of execution units includes a first execution unit configured to execute instructions with the indicated data precision and a second execution unit configured to execute instructions with a second data precision that is different from the indicated data precision, and wherein the controller is configured to select the first execution unit to execute the graphics instruction with the indicated data precision using the graphics data.

41. The device of claim 38, wherein the plurality of execution units includes one or more full-precision execution units and at least four half-precision execution units.

42. The device of claim 41, wherein when the indicated data precision for execution of the graphics instruction comprises a full precision, the controller is configured to select one of the full-precision execution units to execute the graphics instruction using the graphics data.

43. The device of claim 41, wherein when the indicated data precision for execution of the graphics instruction comprises a half precision, the controller is configured to select one of the half-precision execution units to execute the graphics instruction using the graphics data.

44. The device of claim 41, wherein the processor further comprises:
at least one full-precision register bank to store computation results when the at least one full-precision execution unit executes instructions; and
at least four half-precision register banks to store computation results when the at least four half-precision execution units execute instructions.

45. The device of claim 38, wherein the plurality of execution units includes at least one full-precision execution unit and at least one half-precision execution unit, and wherein when the indicated data precision for execution of the graphics instruction comprises a half precision, the controller is configured to shut down power to the at least one full-precision execution unit and cause the at least one half-precision execution unit to execute the graphics instruction using the graphics data.

46. The device of claim 38, wherein the processor comprises a shader processor.

47. The device of claim 38, wherein the device comprises a wireless communication device handset.

48. The device of claim 38, wherein the device comprises one or more integrated circuit devices.

49. A method, comprising:
analyzing, by a compiler executed by a processor, a plurality of application instructions for a graphics application;
for each application instruction that specifies a first data precision level for its execution, generating, by the compiler, one or more corresponding compiled instructions that each indicate the first data precision level for its execution, wherein the first precision level comprises a full data precision level; and
generating, by the compiler, one or more conversion instructions to convert graphics data from a second, different data precision level to the first data precision level when the one or more compiled instructions are executed.

50. The method of claim 49, wherein the second data precision level comprises a half data precision level.

51. The method of claim 49, wherein generating the one or more compiled instructions comprises generating one or more compiled instructions that each indicate a full data precision level when a corresponding application instruction specifies the full data precision level for its execution.

52. The method of claim 49, wherein generating the one or more compiled instructions comprises generating one or more compiled instructions that each indicate a half data precision level when a corresponding application instruction specifies the half data precision level for its execution.

53. The method of claim 49, wherein the one or more compiled instructions each include a predefined field that includes information indicating the first data precision level when the corresponding application instruction specifies the first data precision level for its execution.

54. The method of claim 49, further comprising storing the one or more compiled instructions in memory for subsequent execution.

55. A non-transitory computer-readable storage medium comprising instructions for causing a processor to:
- analyze, by a compiler executed by the processor, a plurality of application instructions for a graphics application;
- for each application instruction that specifies a first data precision level for its execution, generate, by the compiler, one or more corresponding compiled instructions that each indicate the first data precision level for its execution, wherein the first precision level comprises a full data precision level; and
- generate, by the compiler, one or more conversion instructions to convert graphics data from a second, different data precision level to the first data precision level when the one or more compiled instructions are executed.

56. The non-transitory computer-readable storage medium of claim 55, wherein the second data precision level comprises a half data precision level.

57. The non-transitory computer-readable storage medium of claim 55, wherein the instructions for causing the processor to generate the one or more compiled instructions comprise instructions for causing the processor to generate the one or more compiled instructions that each indicate a full data precision level when a corresponding application instruction specifies the full data precision level for its execution.

58. The non-transitory computer-readable storage medium of claim 55, wherein the instructions for causing the processor to generate the one or more compiled instructions comprise instructions for causing the processor to generate the one or more compiled instructions that each indicate a half data precision level when a corresponding application instruction specifies the half data precision level for its execution.

59. The non-transitory computer-readable storage medium of claim 55, wherein the one or more compiled instructions each include a predefined field that includes information indicating the first data precision level when the corresponding application instruction specifies the first data precision level for its execution.

60. The non-transitory computer-readable storage medium of claim 55, further comprising instructions for causing the processor to store the one or more compiled instructions in memory for subsequent execution.

61. An apparatus comprising:
- means for analyzing a plurality of graphics application instructions;
- for each graphics application instruction that specifies a first data precision level for its execution, means for generating one or more corresponding compiled instructions that each indicate the first data precision level for its execution, wherein the first precision level comprises a full data precision level; and
- means for generating one or more conversion instructions to convert graphics data from a second, different data precision level to the first data precision level when the one or more compiled instructions are executed.

62. The apparatus of claim 61, wherein the second data precision level comprises a half data precision level.

63. The apparatus of claim 61, wherein the means for generating the one or more compiled instructions comprises means for generating the one or more compiled instructions that each indicate a full data precision level when a corresponding graphics application instruction specifies the full data precision level for its execution.

64. The apparatus of claim 61, wherein the means for generating the one or more compiled instructions comprises means for generating the one or more compiled instructions that each indicate a half data precision level when a corresponding graphics application instruction specifies the half data precision level for its execution.

65. The apparatus of claim 61, wherein the one or more compiled instructions each include a predefined field that includes information indicating the first data precision level when the corresponding graphics application instruction specifies the first data precision level for its execution.

66. The apparatus of claim 61, further comprising means for storing the one or more compiled instructions in memory for subsequent execution.

67. A non-transitory computer-readable data storage medium comprising:
- one or more first executable instructions generated by a compiler, wherein the one or more first executable instructions, when executed by a programmable streaming processor, support one or more functions of a graphics application, wherein each of the first executable instructions indicates a first data precision level for its execution;
- one or more second executable instructions generated by a compiler, wherein the one or more second executable instructions, when executed by the programmable streaming processor, support one or more functions of the graphics application, wherein each of the second executable instructions indicates a second data precision level different from the first data precision level for its execution, wherein the first precision level comprises a full data precision level; and
- one or more third executable instructions generated by a compiler, wherein the one or more third executable instructions, when executed by the programmable streaming processor, support one or more functions of the graphics application, wherein each of the third executable instructions converts graphics data from the second data precision level to the first data precision level when the one or more first executable instructions are executed by a programmable streaming processor.

68. The non-transitory computer-readable data storage medium of claim 67, and wherein the second data precision level comprises a half data precision level.

* * * * *